(12) United States Patent
Hayashi

(10) Patent No.: US 11,099,920 B2
(45) Date of Patent: Aug. 24, 2021

(54) IN-VEHICLE SYSTEM, WIRELESS COMMUNICATION DEVICE, AND CONTROL METHOD

(71) Applicant: TOYOTA JIDOSHA KABUSHIKI KAISHA, Toyota (JP)

(72) Inventor: Kazushige Hayashi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/711,519

(22) Filed: Dec. 12, 2019

(65) Prior Publication Data

US 2020/0226017 A1   Jul. 16, 2020

(30) Foreign Application Priority Data

Jan. 16, 2019   (JP) ............................. JP2019-005405

(51) Int. Cl.
| | |
|---|---|
| *G06F 11/00* | (2006.01) |
| *G06F 11/07* | (2006.01) |
| *G06F 11/14* | (2006.01) |
| *H04W 4/40* | (2018.01) |
| *H04W 52/02* | (2009.01) |
| *G06F 11/32* | (2006.01) |

(52) U.S. Cl.
CPC ........ *G06F 11/0739* (2013.01); *G06F 11/076* (2013.01); *G06F 11/0784* (2013.01); *G06F 11/0793* (2013.01); *G06F 11/1441* (2013.01); *G06F 11/327* (2013.01); *H04W 4/40* (2018.02); *H04W 52/0277* (2013.01)

(58) Field of Classification Search
CPC .. G06F 11/008; G06F 11/079; G06F 11/3409; G06F 11/3604; G06F 11/3452; G06F 11/1441; G06F 9/442
USPC ....................................................... 714/1–57
See application file for complete search history.

(56) References Cited

U.S. PATENT DOCUMENTS

| | | | | |
|---|---|---|---|---|
| 2009/0247240 A1* | 10/2009 | Yang | .......................... | G06F 1/30 455/573 |
| 2011/0250876 A1* | 10/2011 | Doherty | ................. | H04W 8/245 455/419 |
| 2013/0311836 A1* | 11/2013 | Hurst | ...................... | H04W 4/60 714/48 |
| 2014/0187199 A1* | 7/2014 | Yan | ........................ | H04W 48/02 455/410 |
| 2015/0317198 A1* | 11/2015 | Kume | ................. | G06F 11/0739 714/6.11 |

(Continued)

FOREIGN PATENT DOCUMENTS

| | | |
|---|---|---|
| JP | 3-85226 U | 8/1991 |
| JP | 2009-228435 A | 10/2009 |
| JP | 2014-115950 A | 6/2014 |

*Primary Examiner* — Sarai E Butler
(74) *Attorney, Agent, or Firm* — Oblon, McClelland, Maier & Neustadt, L.L.P.

(57) ABSTRACT

An in-vehicle system performs wireless communication with electric power supplied from a battery mounted on a vehicle. The in-vehicle system includes a wireless communication unit configured to perform the wireless communication, a counting unit configured to count the number of resets that have occurred in the wireless communication unit; and an operation limiting unit configured to, when a predetermined power supply of the vehicle is off, limit the number of resets that occur in the wireless communication unit.

10 Claims, 7 Drawing Sheets

(56) References Cited

U.S. PATENT DOCUMENTS

| | | | | |
|---|---|---|---|---|
| 2015/0346786 | A1* | 12/2015 | Lundquist | G06F 1/3203 |
| | | | | 713/300 |
| 2016/0378610 | A1* | 12/2016 | Allen-Ware | G06F 1/28 |
| | | | | 714/3 |
| 2018/0212456 | A1* | 7/2018 | AbuEideh | H02J 7/022 |
| 2019/0111907 | A1* | 4/2019 | Harata | G06F 8/65 |

\* cited by examiner

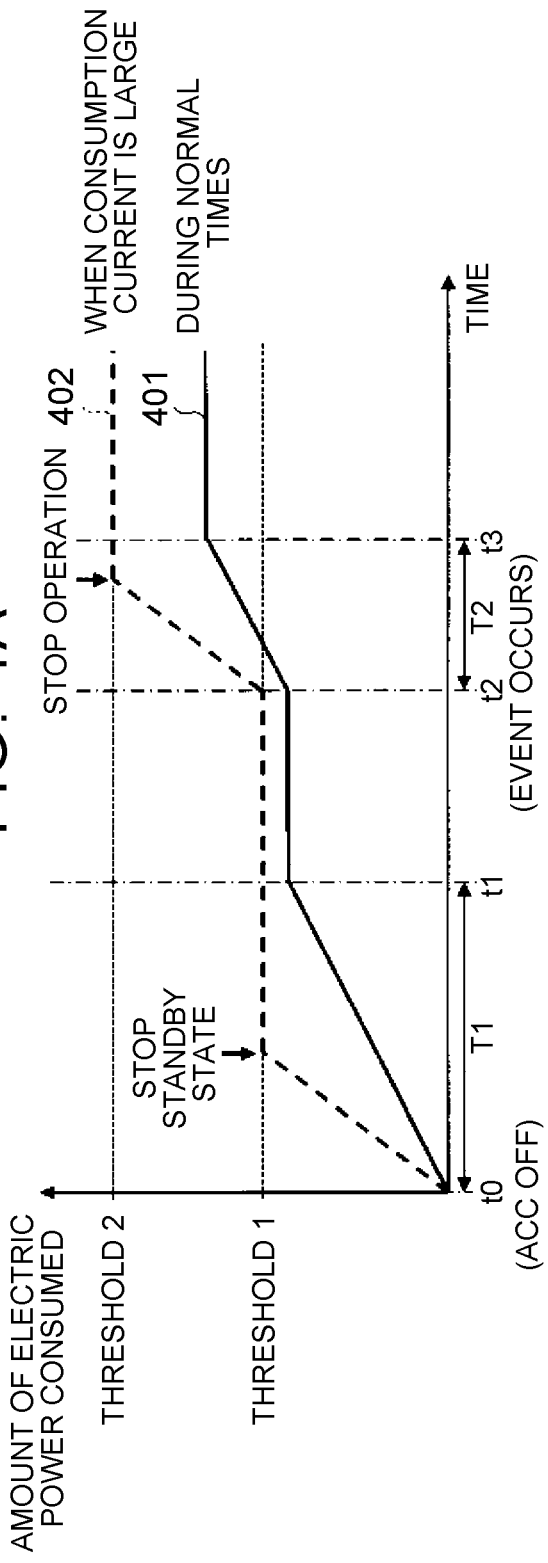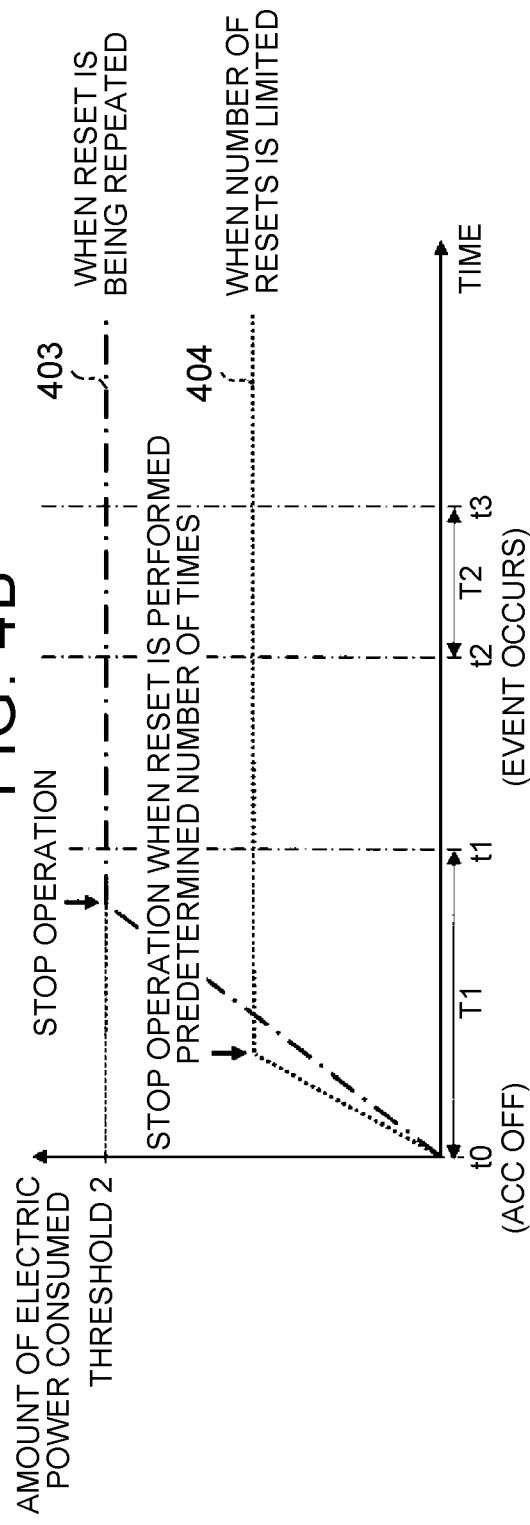

IN-VEHICLE SYSTEM, WIRELESS COMMUNICATION DEVICE, AND CONTROL METHOD

INCORPORATION BY REFERENCE

The disclosure of Japanese Patent Application No. 2019-005405 filed on Jan. 16, 2019 including the specification, drawings and abstract is incorporated herein by reference in its entirety.

BACKGROUND

1. Technical Field

The disclosure relates to an in-vehicle system, a wireless communication device, and a control method.

2. Description of Related Art

There are known a vehicle and an in-vehicle system that each include a wireless communication device that performs wireless communication with electric power supplied from a battery mounted on the vehicle, such as an automobile.

There is known a technique for, in an in-vehicle electronic control unit configured to be reset by itself when the in-vehicle electronic control unit determines a program abnormality through memory checking, launching a fail-safe program instead of reset when the number of resets is greater than or equal to a set value (see, for example, Japanese Unexamined Patent Application Publication No. 2014-115950 (JP 2014-115950 A)).

SUMMARY

With the technique described in JP 2014-115950 A, for example, when a wireless communication device of an in-vehicle system is repeatedly reset as a result of a software abnormality, the wireless communication device can be recovered to a normal state by running software, such as a fail-safe program.

However, for example, when the wireless communication device is being repeatedly reset because of an abnormality of hardware (such as a failure of a part) of the wireless communication device, it is difficult to restore the in-vehicle system to a normal state with software. The wireless communication device of the in-vehicle system mostly operates on a constant power supply so that, for example, emergency call, remote monitoring, or the like, can be performed. Therefore, when the wireless communication device is being repeatedly reset, a dead (over discharge) battery of the vehicle can be induced.

In this way, with the existing technique, in an in-vehicle system that performs wireless communication with electric power supplied from a battery of a vehicle, in the event of an abnormality that is difficult to recover from with software, it can be difficult to limit power consumption from the battery.

An embodiment of the disclosure provides an in-vehicle system that performs wireless communication with electric power supplied from a battery of a vehicle and that is able to limit power consumption from the battery even in the event of an abnormality that is difficult to recover from with software.

An in-vehicle system according to an embodiment of the disclosure is an in-vehicle system that performs wireless communication with electric power supplied from a battery mounted on a vehicle. The in-vehicle system includes a wireless communication unit configured to perform the wireless communication, a counting unit configured to count the number of resets that have occurred in the wireless communication unit, and an operation limiting unit configured to, when a predetermined power supply of the vehicle is off, limit the number of resets that occur in the wireless communication unit.

With the above configuration, in the in-vehicle system, when the predetermined power supply of the vehicle is off and the wireless communication unit is repeating reset, the operation limiting unit limits the number of resets that occur in the wireless communication unit. Thus, the in-vehicle system is able to, even in the event of an abnormality that is difficult to recover from with software, limit power consumption from the battery of the vehicle by stopping a reset repetition of the wireless communication unit.

In the above-described embodiment, the predetermined power supply may include an accessory power supply of the vehicle.

Thus, in an accessory power off period in which the battery mounted on the vehicle is not charged, the in-vehicle system is able to limit power consumption from the battery of the vehicle in the event of an abnormality that is difficult to recover from with software.

In the above-described embodiment, the operation limiting unit may be configured to, when the number of resets, counted by the counting unit, has reached a predetermined number or exceeded the predetermined number while the predetermined power supply is off, stop operation of the wireless communication unit.

With this configuration, the in-vehicle system stops the operation of the wireless communication unit depending on the number of resets that have occurred in the wireless communication unit. Therefore, for example, when the amount of electric power consumed has increased as a result of data communication, or the like, the in-vehicle system is able to reduce an erroneous stop of the operation of the wireless communication unit.

In the above-described embodiment, the in-vehicle system may further include a warning unit configured to, when the operation limiting unit is stopping the operation of the wireless communication unit, output a warning indicator or a warning sound indicating that an abnormality is occurring.

With this configuration, for example, even when an ignition power supply or an accessory power supply is off, the in-vehicle system is able to notify a user of the vehicle that an abnormality is occurring in the wireless communication unit.

In the above-described embodiment, the counting unit may be configured to count the number of resets in a part or hardware component configured to perform the wireless communication.

With this configuration, the in-vehicle system is able to further appropriately detect a reset repetition due to a fault in a part or hardware component that performs the wireless communication, that is, the event of an abnormality that is difficult to recover from with software.

In the above-described embodiment, the operation limiting unit may be configured to, when the number of resets, counted by the counting unit, when the predetermined power supply is off has reached a predetermined number or exceeded the predetermined number, stop supplying electric power to a part or hardware component configured to perform the wireless communication.

With this configuration, the in-vehicle system is able to stop the wireless communication unit during a reset repetition due to a fault in a part or hardware component that performs the wireless communication, that is, in the event of an abnormality that is difficult to recover from with software.

Other embodiments of the disclosure are implemented by a wireless communication device and a control method.

According to the embodiments of the disclosure, in an in-vehicle system that performs wireless communication with electric power supplied from a battery of a vehicle, even in the event of an abnormality that is difficult to recover from with software, power consumption from the battery can be limited.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a graph for illustrating limitations on operation with an operation limiting unit according to the embodiment;

FIG. 4B is a graph for illustrating limitations on operation with the operation limiting unit according to the embodiment;

DETAILED DESCRIPTION OF EMBODIMENTS

Figure 1:
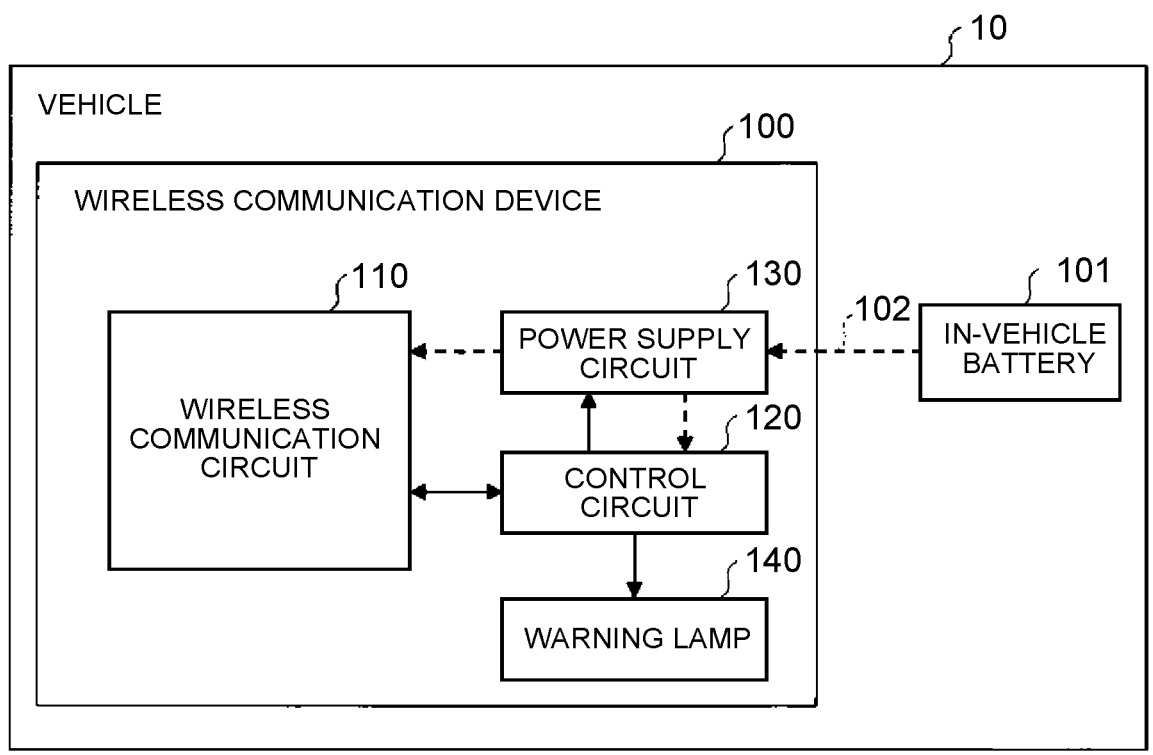
FIG. 1 is a diagram that shows an example of the system configuration of an in-vehicle system according to an embodiment.

Hereinafter, embodiments of the disclosure will be described with reference to the accompanying drawings.
System Configuration FIG. 1 is a diagram that shows a configuration example of an in-vehicle system according to an embodiment. The in-vehicle system 1 includes, for example, an in-vehicle battery 101 and a wireless communication device 100. The in-vehicle battery 101 is mounted on a vehicle 10, such as an automobile. The wireless communication device 100 performs wireless communication with electric power supplied from the in-vehicle battery 101.

The wireless communication device 100 is, for example, an in-vehicle communication device, such as a data communication module (DCM). The wireless communication device 100 is able to connect with a communication network by wireless wide area network (WAN) communication and communicate with other vehicles, a server that manages vehicles, and the like. Examples of wireless WAN communication can include various wireless communication services, such as 3rd generation (3G), 4th generation (4G), and 5th generation (5G).

The wireless communication device 100 is able to perform wireless communication, such as emergency call and remote monitoring, with constant power supplied from the in-vehicle battery 101 even when an ignition power supply, an accessory power supply, and the like, are off.

In the example of FIG. 1, the wireless communication device 100 includes a wireless communication circuit 110, a control circuit 120, a power supply circuit 130, a warning lamp 140, and other components.

The wireless communication circuit 110 includes, for example, a radio-frequency circuit that transmits or receives radio waves, a signal processing circuit that performs signal processing, a communication control circuit that controls communication, and other circuits. At least part of these circuits is implemented by, for example, one or more communication large scale integrations (LSIs), or the like. In the present embodiment, the wireless communication circuit 110 may have a selected configuration, so the detailed description is omitted.

Figure 2:
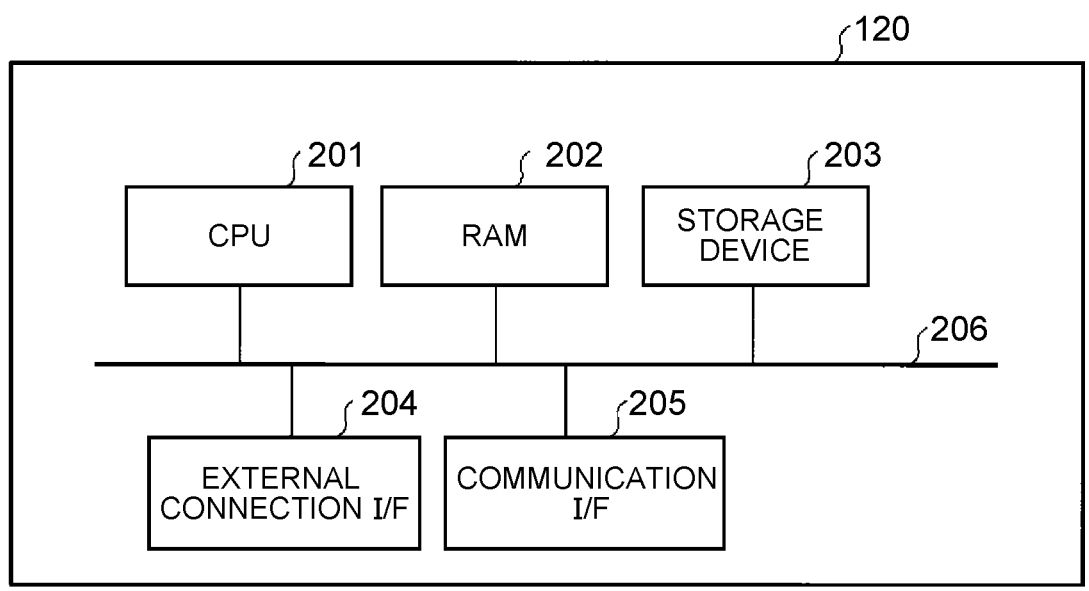
FIG. 2 is a diagram that shows an example of the hardware configuration of a control circuit according to the embodiment.

The control circuit 120 is a computer that generally controls the wireless communication device 100. For example, as shown in FIG. 2, the control circuit 120 includes a central processing unit (CPU) 201, a random access memory (RAM) 202, a storage device 203, an external connection interface (I/F) 204, a communication I/F 205, a system bus 206, and the like.

The CPU 201 is a computing device that implements functions to be executed by the control circuit 120 by loading programs, data, and the like, stored in, for example, the storage device 203 onto the RAM 202 and executing processes. The RAM 202 is a volatile memory that is used as a working area, or the like, of the CPU 201. The storage device 203 is a large-capacity nonvolatile storage device that stores, for example, an operating system (OS), control programs, and various data.

The external connection I/F 204 is an interface for connecting external circuits or devices, such as the wireless communication circuit 110, the power supply circuit 130, and the warning lamp 140, to the control circuit 120. The communication I/F 205 is an interface for connecting the control circuit 120 to an in-vehicle network provided in the vehicle 10 and communicating with various electronic control units (ECUs) mounted on the vehicle 10. The system bus 206 is connected in common to the above-described components, and transfers, for example, address signals, data signals, and various control signals.

The power supply circuit 130 of FIG. 1, for example, converts electric power 102, which is supplied from the in-vehicle battery 101, into a predetermined voltage where necessary and supplies the electric power 102 to the wireless communication circuit 110, the control circuit 120, and the like. The power supply circuit 130 has the function of turning on or off electric power to be supplied to the wireless communication circuit 110 under control from the control circuit 120. The power supply circuit 130 is implemented by, for example, one or more power supply integrated circuits (ICs), a power supply LSI, or the like.

The warning lamp 140 is implemented by, for example, multicolor light emitting diodes (LEDs), and emits light in designated color at designated timing under control from the control circuit 120.

FIG. 1 is an example of the system configuration of the in-vehicle system 1. For example, the control circuit 120 may be an electronic control unit that is provided outside the wireless communication device 100 and that has a similar configuration to the control circuit 120 shown in FIG. 2. Similarly, the warning lamp 140 may be an LED (for example, an LED that the vehicle 10 includes) provided outside the wireless communication device 100. The power supply circuit 130 may be divided into a first power supply circuit that supplies electric power to the wireless communication circuit 110 and a second power supply circuit that supplies electric power to the control circuit 120. Furthermore, the first power supply circuit may be provided inside the wireless communication circuit 110 or may be provided outside the wireless communication device 100.

Functional Configuration

Figure 3:
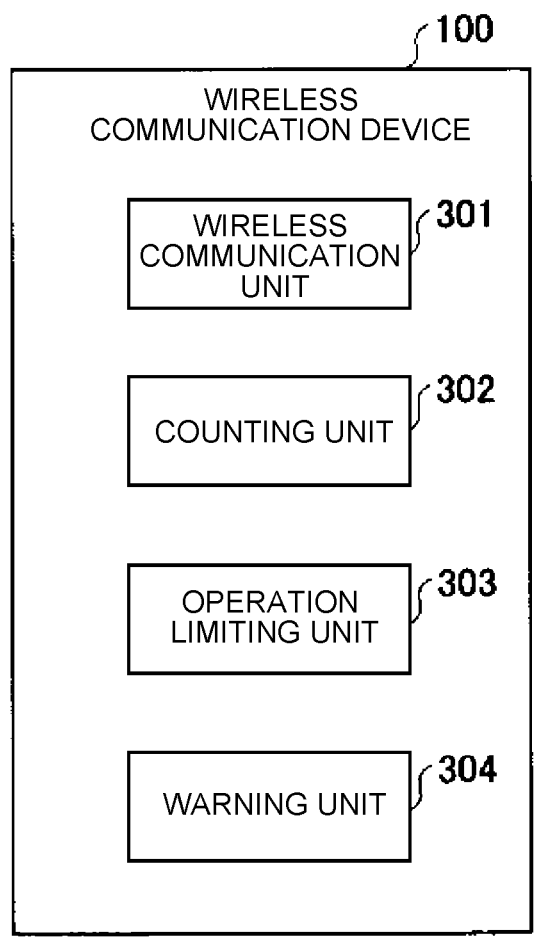
FIG. 3 is a diagram that shows an example of the functional configuration of a wireless communication device according to the embodiment.

Subsequently, the functional configuration of the in-vehicle system 1 will be described. FIG. 3 is a diagram that shows an example of the functional configuration of the wireless communication device according to the embodiment. As shown in FIG. 3, as an example, the wireless communication device 100 includes a wireless communication unit 301, a counting unit 302, an operation limiting unit 303, a warning unit 304, and the like.

The wireless communication unit 301 is implemented by, for example, the wireless communication circuit 110 of FIG. 1 and a program that the control circuit 120 runs, and performs various wireless communications related to the vehicle 10. The wireless communication unit 301 stays standby for wireless WAN communication for a predetermined period (for example, several days) even after the accessory power supply, ignition power supply, and the like, of the vehicle 10 are turned off, and maintains a state of being able to perform communication, such as emergency call and remote monitoring, with a management server, or the like.

The counting unit 302 is implemented by, for example, a program that the control circuit 120 of FIG. 1 runs, and executes a counting process of counting the number of resets that have occurred in the wireless communication unit 301. For example, the counting unit 302 counts the number of reset signals, reset notifications, and the like, that are output from the wireless communication unit 301.

Preferably, the counting unit 302 counts the number of resets that have occurred in circuits or parts (for example, communication LSI) included in the wireless communication circuit 110. The counting unit 302 may be implemented by, for example, a hardware component, such as a logic circuit.

The operation limiting unit 303 is implemented by, for example, a program that the control circuit 120 of FIG. 1 runs, and limits the number of resets that occur in the wireless communication unit 301 when a predetermined power supply of the vehicle 10 is off. The predetermined power supply is a power supply, such as the accessory power supply and the ignition power supply, that does not cause the in-vehicle battery 101 to be charged when the power supply is off.

As a preferable example, the accessory power supply that is connected to the wireless communication device 100 may be applied as the predetermined power supply. For example, the operation limiting unit 303 monitors the number of resets of the wireless communication unit 301 with the counting unit 302 when the accessory power supply of the vehicle 10 is off, and stops the operation of the wireless communication unit 301 when the number of resets has reached a predetermined number (or exceeded the predetermined number). For example, the operation limiting unit 303 stops the operation of the wireless communication unit 301 by controlling the power supply circuit 130 of FIG. 1 to stop supplying electric power to the wireless communication circuit 110, or the components, such as the communication LSI.

The operation limiting unit 303 is not limited to stopping supply of electric power to the wireless communication circuit 110 and may be configured to limit the number of resets of the wireless communication unit 301 with another method. The operation limiting unit 303 may limit the number of resets of the wireless communication unit 301 by, for example, continuously asserting a reset signal of the wireless communication circuit 110.

Thus, the in-vehicle system 1 is able to limit power consumption from the in-vehicle battery 101 mounted on the vehicle 10, for example, in the event of an abnormality that is difficult to recover from with software in an accessory power off period in which the in-vehicle battery 101 of the vehicle 10 is not charged.

The warning unit 304 notifies a user of an abnormality by outputting warning indication or warning sound indicating that the abnormality is occurring when the operation limiting unit 303 is stopping the operation of the wireless communication unit 301. As an example, when the wireless communication device 100 performs resetting, the warning unit 304 lights up the warning lamp 140 in red for approximately several seconds to several tens of seconds during resetting, and lights up the warning lamp 140 in green until the next reset after startup.

The user is informed in advance that an abnormality is occurring when the warning lamp 140 continues lighting up in red or when the warning lamp 140 repeats lighting up in red. Thus, the user is able to recognize that an abnormality is occurring in the wireless communication device 100 and contact, for example, a dealer, or the like.

Preferably, the warning unit 304 stores the fact that an abnormality is occurring, in the storage device 203, or the like, as a diagnosed result. Thus, even at a dealer, occurrence of an abnormality, the number of times an abnormality has occurred, and the like, can be checked.

At least part of the functional components of the wireless communication device 100 shown in FIG. 3 may be implemented by, for example, an electronic control unit outside the wireless communication device 100. In other words, each of the functional components of the wireless communication device 100 shown in FIG. 3 may be included in any device of the in-vehicle system 1.

Limitations on Operation by Operation Limiting Unit

FIG. 4A and FIG. 4B are graphs for illustrating limitations on operation with the operation limiting unit according to the embodiment. In FIG. 4A and FIG. 4B, the abscissa axis represents a lapse of time after the accessory power supply (hereinafter, referred to as ACC power supply) of the vehicle 10 is turned off, and the ordinate axis represents the amount of electric power consumed by the wireless communication device 100. The accessory power supply is an example of the predetermined power supply.

In FIG. 4A, a first line 401 represents the amount of electric power consumed by the wireless communication device 100 during normal times, and a second line 402 represents an example of the amount of electric power consumed when electric power consumed by the wireless communication device 100 is increasing because of, for example, an abnormality in software.

During normal times, as represented by the first line 401 of FIG. 4A, the wireless communication device 100 continues staying standby for a predetermined period T1 (for example, several days) after the ACC power supply is turned off at time t0, and stops the standby state at time t1. When a predetermined event (for example, detection of theft)

occurs at time t2, the wireless communication device 100 resumes staying standby, and continues staying standby for a period T2 (for example, several days) until time t3.

On the other hand, during abnormal times when the amount of electric power consumed is large, the wireless communication device 100 continues staying standby after the ACC power supply is turned off at time t0, and stops the standby state when the amount of electric power consumed reaches a threshold 1, as represented by the second line 402 of FIG. 4A. The threshold 1 is, for example, a threshold determined in advance to stop the standby state of the wireless communication device 100 through software control when the amount of electric power consumed by the wireless communication device 100 is large.

During abnormal times when the amount of electric power consumed is large, the wireless communication device 100 resumes staying standby when a predetermined event (for example, detection of theft) occurs at time t2, and stops the operation of the wireless communication unit 301 through hardware control (for example, stops supplying electric power) when the amount of electric power consumed reaches a threshold 2. The threshold 2 is, for example, a threshold determined in advance to stop the operation of the wireless communication device 100 through hardware control to prevent over discharge of the in-vehicle battery 101 when the amount of electric power consumed by the wireless communication device 100 is large.

Through the above control, the operation limiting unit 303 performs communication, such as emergency call and remote monitoring, and prevents over discharge of the in-vehicle battery 101 (dead battery) even after the ACC power supply is turned off.

However, with this method, when the wireless communication device 100 is repeating reset because of, for example, an abnormality in the hardware component of the wireless communication device 100, it is difficult to prevent over discharge of the in-vehicle battery 101.

For example, in FIG. 4B, a third line 403 represents an example of the amount of electric power consumed, for example, when the wireless communication device 100 is repeating reset because of an abnormality in the hardware component. In this case, as in the case of FIG. 4A, the wireless communication device 100 may not be able to stop the reset of the hardware component even when outputting a command to stop the standby state to the wireless communication unit 301 at the threshold 1. In this case, as represented by the third line 403 of FIG. 4B, in the period T1, the amount of electric power consumed by the wireless communication device 100 linearly increases, and, for example, when the amount of electric power consumed reaches the threshold 2, the wireless communication device 100 stops its operation through hardware control.

In this case, since the threshold 2 is a threshold for preventing over discharge of the in-vehicle battery 101, the operation of the wireless communication device 100 is stopped after a large amount of electric power is consumed. The threshold 2 is also applied when the wireless communication device 100 is performing wireless communication with a management server, or the like, so a sufficiently large value is set for the threshold 2 such that the wireless communication device 100 does not stop its operation during wireless communication.

Therefore, for example, when the user of the vehicle 10 repeats travel of a relatively short distance, the operation represented by the third line 403 of FIG. 4B is repeated in a state where the in-vehicle battery 101 is not sufficiently charged, and the in-vehicle battery 101 can be over discharged.

The wireless communication device 100 according to the present embodiment has the function of limiting the number of resets of the wireless communication device 100, for example, when the ACC power supply is off.

For example, in FIG. 4B, a fourth line 404 represents an example of the amount of electric power consumed when the number of resets of the wireless communication device 100 is limited. In this case, as in the case of the third line 403, the wireless communication device 100 is not able to stop the reset of the hardware component even when outputting a command to stop the standby state to the wireless communication unit 301 at the threshold 1. However, the operation limiting unit 303 stops the operation of the wireless communication unit 301 when the number of resets, counted by the counting unit 302, has reached a predetermined number (or exceeded the predetermined number) after the ACC power supply is turned off.

With this configuration, as represented by the fourth line 404 of FIG. 4B, the operation limiting unit 303 is able to stop the operation of the wireless communication device 100 at the amount of electric power consumed, which is sufficiently less than the threshold 2. With this method, the operation of the wireless communication device 100 is not limited unless the wireless communication device 100 is repeating reset, so such an erroneous operation that the operation of the wireless communication device 100 stops during wireless communication can also be avoided.

The number of resets to stop the operation of the wireless communication device 100 is preset to a predetermined value, such as ten times per hour and ten times per 30 minutes. As another example, the number of resets to stop the operation of the wireless communication device 100 may be determined by the operation limiting unit 303 according to, for example, the remaining level of the in-vehicle battery 101.

Processing Flow

Next, the processing flows of control method for the in-vehicle system 1 and the wireless communication device 100 according to the embodiments of the disclosure will be described.

First Embodiment

Figure 5:
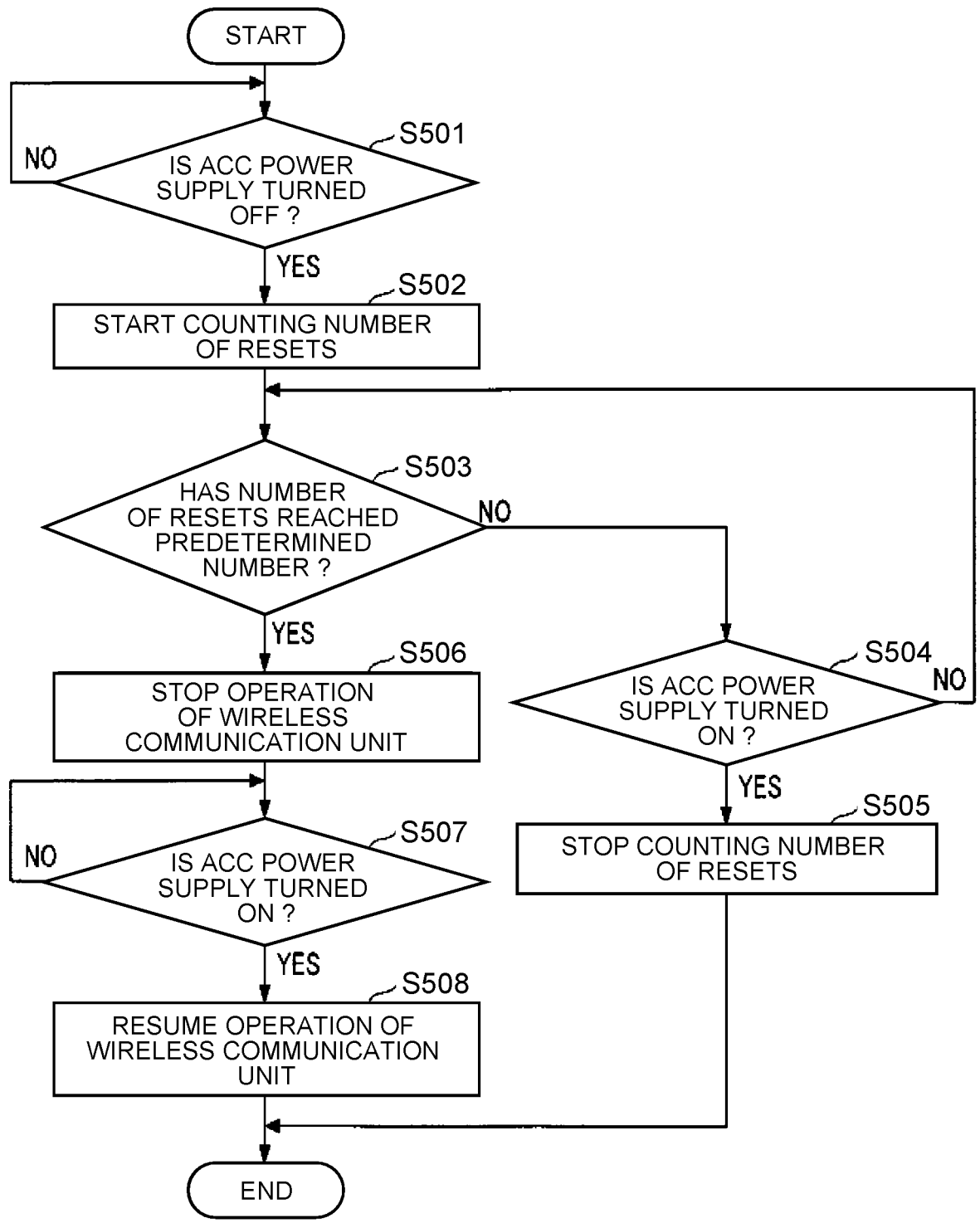
FIG. 5 is a flowchart that shows an example of an operation limiting process according to a first embodiment.

FIG. 5 is a flowchart that shows an example of an operation limiting process according to a first embodiment. This process shows an example of the operation limiting process that the operation limiting unit 303 executes.

In step S501, the operation limiting unit 303 determines whether the ACC power supply (an example of the predetermined power supply) of the vehicle 10 is turned off, and, when the operation limiting unit 303 determines that the ACC power supply is turned off, the operation limiting unit 303 executes the process in step S502 and the following steps.

In step S502, the operation limiting unit 303 starts counting the number of resets that occur in the wireless communication unit 301 with the use of the counting unit 302.

In step S503, the operation limiting unit 303 determines whether the number of resets that have occurred in the wireless communication unit 301 has reached the predetermined number set in advance.

When the number of resets has not reached the predetermined number set in advance, the operation limiting unit 303 advances the process to step S504. On the other hand, when the number of resets has reached the predetermined number set in advance, the operation limiting unit 303 advances the process to step S506.

When the process proceeds to step S504, the operation limiting unit 303 determines whether the ACC power supply of the vehicle 10 is turned on. When the ACC power supply of the vehicle 10 is not turned on, the operation limiting unit 303 returns the process to step S503 and executes the process in step S503 and the following steps again. On the other hand, when the ACC power supply of the vehicle 10 is turned on, the operation limiting unit 303 stops counting the number of resets with the use of the counting unit 302 in step S505.

On the other hand, when the process proceeds from step S503 to step S506, the operation limiting unit 303 stops the operation of the wireless communication unit 301. For example, the operation limiting unit 303 stops supplying electric power to the wireless communication circuit 110 by controlling the power supply circuit 130 of FIG. 1, thus stopping the operation of the wireless communication unit 301. With this configuration, for example, even when an abnormality is occurring in the hardware component of the wireless communication circuit 110 and the wireless communication circuit 110 is repeating reset, the reset repetition can be stopped.

In step S507, the operation limiting unit 303 determines whether the ACC power supply of the vehicle 10 is turned on and, when the operation limiting unit 303 determines that the ACC power supply is turned on, the operation limiting unit 303 resumes the operation of the wireless communication unit 301 in step S508 For example, the operation limiting unit 303 starts supplying electric power to the wireless communication circuit 110 by controlling the power supply circuit 130 of FIG. 1, thus resuming the operation of the wireless communication unit 301.

Through the above process, in the in-vehicle system 1, when the predetermined power supply of the vehicle 10 is off and the wireless communication unit 301 is repeating reset, the operation limiting unit 303 limits the number of resets that occur in the wireless communication unit 301. With this configuration, even in the event of an abnormality that is difficult to recover from with software, the in-vehicle system 1 is able to limit power consumption from the in-vehicle battery 101 of the vehicle 10 by stopping a reset repetition of the wireless communication unit 301.

Therefore, according to the first embodiment, in the in-vehicle system 1 that performs wireless communication with electric power supplied from the in-vehicle battery 101 of the vehicle 10, even in the event of an abnormality that is difficult to recover from with software, power consumption from the in-vehicle battery 101 can be limited.

Second Embodiment

With the operation limiting process according to the first embodiment, even when the wireless communication device 100 is repeating reset because of, for example, an abnormality in a hardware component of the wireless communication device 100, power consumption from the in-vehicle battery 101 of the vehicle 10 can be limited.

However, it is inconvenient that only the process described in the first embodiment is not able to notify the user of the vehicle 10 that the wireless communication device 100 is repeating reset because of, for example, an abnormality in a hardware component.

In a second embodiment, an example of a process in the case where the user of the vehicle 10 is notified that the wireless communication device 100 is repeating reset because of, for example, an abnormality in a hardware component will be described.

Figure 6:
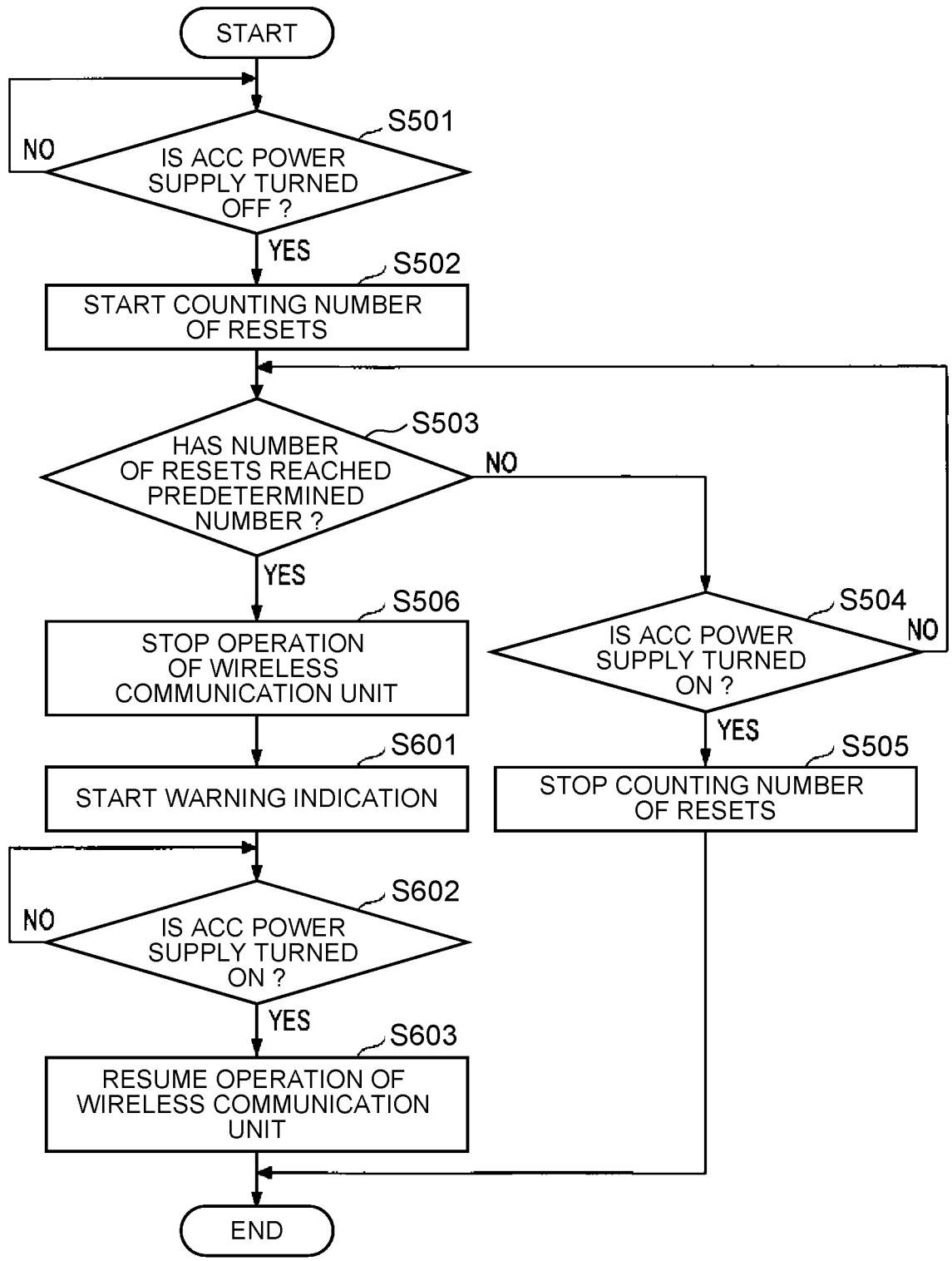
FIG. 6 is a flowchart that shows an example of an operation limiting process according to a second embodiment.

FIG. 6 is a flowchart that shows an example of an operation limiting process according to the second embodiment. In the process shown in FIG. 6, the process of step S501 to step S506 is similar to the process according to the first embodiment shown in FIG. 5, so the difference from the process according to the first embodiment will be mainly described.

After the operation limiting unit 303 stops the operation of the wireless communication unit 301 in step S506, the warning unit 304 starts warning indication that indicates that an abnormality is occurring in the wireless communication device 100 in step S601. For example, the warning unit 304 notifies the user that an abnormality is occurring in the wireless communication device 100 by lighting up (or blinking) the warning lamp 140 of FIG. 1 in red. The warning unit 304 may be configured to output a warning sound from a speaker, or the like, of the vehicle 10 instead of (or in addition to) warning indication.

In step S602, the operation limiting unit 303 determines whether the ACC power supply of the vehicle 10 is turned on. When the ACC power supply is turned on, the operation limiting unit 303 executes the process of step S603.

In step S603, the operation limiting unit 303 resumes the operation of the wireless communication unit 301. For example, the operation limiting unit 303 starts supplying electric power to the wireless communication circuit 110 by controlling the power supply circuit 130 of FIG. 1, thus resuming the operation of the wireless communication unit 301.

With the above-described process, for example, even when the ignition power supply or accessory power supply of the vehicle 10 is off, the in-vehicle system 1 is able to notify the user of the vehicle 10 that an abnormality is occurring in the wireless communication unit 301.

Third Embodiment

In the first embodiment, the example of the case where the number of resets at which the operation limiting unit 303 stops the operation of the wireless communication unit 301 is set in advance is described. In a third embodiment, an example of a process in the case where the operation limiting unit 303 changes (determines) the number of resets to stop the operation of the wireless communication unit 301 according to the remaining level of the in-vehicle battery 101 will be described.

The remaining level of the in-vehicle battery 101 is, for example, a current capacity that the in-vehicle battery 101 can discharge at a current amount of charge. The operation limiting unit 303 is able to calculate the remaining level of the in-vehicle battery 101 by, for example, subtracting the amount of current consumed from a current capacity at the time of full charge of the in-vehicle battery 101.

Figure 7:
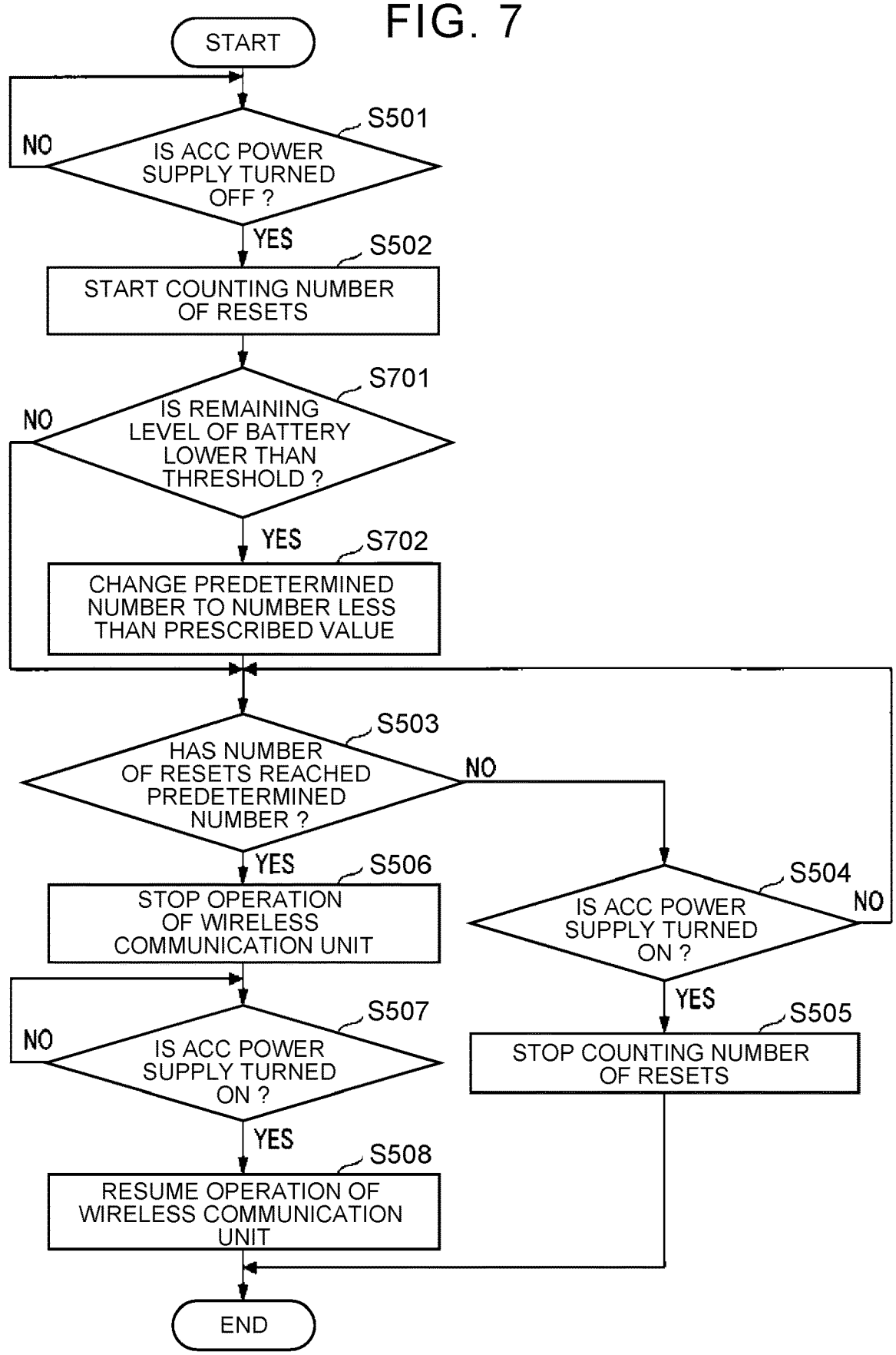
FIG. 7 is a flowchart that shows an example of an operation limiting process according to a third embodiment.

FIG. 7 is a flowchart that shows an example of an operation limiting process according to the third embodiment. This process shows an example of a process in the case where the operation limiting unit 303 changes (determines) the number of resets to stop the operation of the wireless communication unit 301 according to the remaining level of the in-vehicle battery 101. In the process shown in FIG. 7, the process of step S501, step S502, and step S503 to step S508 are similar to the process according to the first embodiment shown in FIG. 5, so the difference from the first embodiment will be mainly described.

In step S701, the operation limiting unit 303 determines whether the remaining level of the in-vehicle battery 101 is lower than a threshold. It is assumed that the threshold is set in advance to, for example, a value for determining that the remaining level of the in-vehicle battery 101 is low.

When the remaining level of the in-vehicle battery 101 is less than the threshold, the operation limiting unit 303 advances the process to step S702. On the other hand, when the remaining level of the in-vehicle battery 101 is higher than or equal to the threshold, the operation limiting unit 303 advances the process to step S503.

When the process proceeds to step S702, the operation limiting unit 303 changes the number of resets (predetermined number) to determine whether the operation of the wireless communication unit 301 is stopped, to a number less than a prescribed value.

The process shown in step S701 and step S702 is one example. For example, when the remaining level of the in-vehicle battery 101 is higher than the threshold, the operation limiting unit 303 may be configured to change the predetermined number to a number greater than a prescribed value. Alternatively, the operation limiting unit 303 may prestore the correlation between each of a plurality of thresholds for separating the remaining level of the in-vehicle battery 101 into a plurality of ranges and a set value of a predetermined number for each range, and, for example, change the predetermined number according to the remaining level of the in-vehicle battery 101.

In short, the operation limiting unit 303 may be configured to execute the process in step S503 and the following steps with the changed predetermined number according to the remaining level of the in-vehicle battery 101.

Preferably, the operation limiting unit 303 sets the predetermined number such that the predetermined number increases as the remaining level of the in-vehicle battery 101 increases, and sets the predetermined number such that the predetermined number reduces as the remaining level of the in-vehicle battery 101 reduces.

Figure 8:
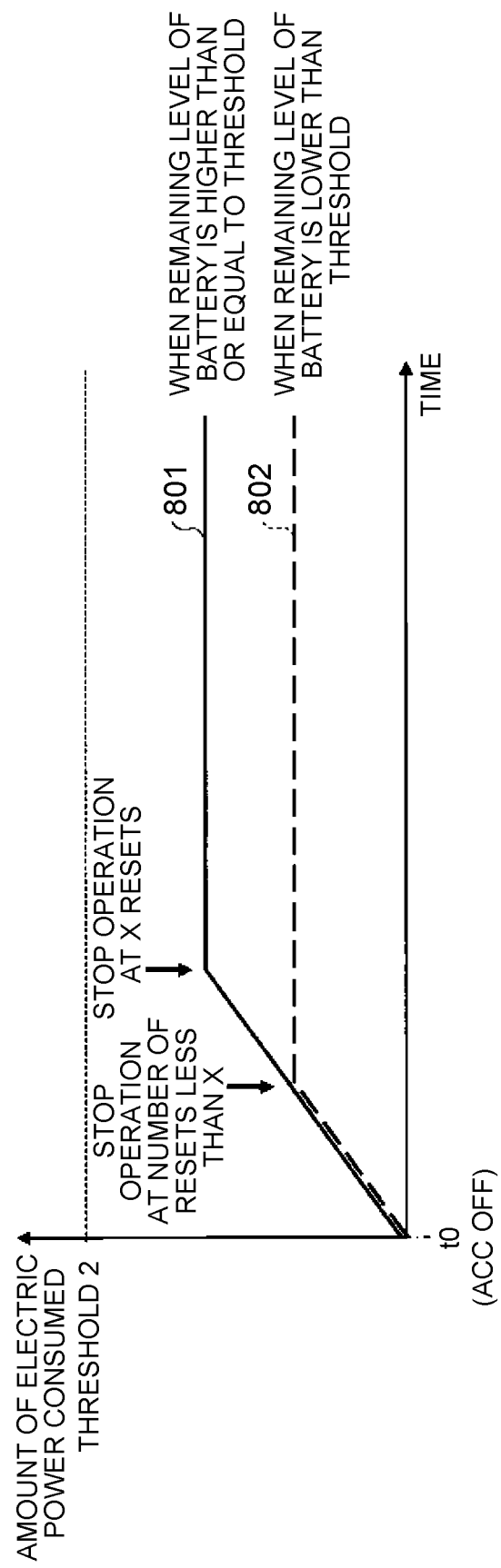
FIG. 8 is a graph that shows the image of one example of limitations on operation with the operation limiting unit according to the third embodiment.

FIG. 8 is a graph that shows the image of one example of limitations on operation with the operation limiting unit according to the third embodiment. In FIG. 8, the abscissa axis represents a lapse of time after the ACC power supply of the vehicle 10 is turned off, and the ordinate axis represents the amount of electric power consumed by the wireless communication device 100.

When the remaining level of the in-vehicle battery 101 is higher than or equal to the threshold, the operation limiting unit 303 stops the operation of the wireless communication unit 301 when reset has occurred in the wireless communication unit 301 X times (X is an integer greater than or equal to two), as represented by the solid line 801 of FIG. 8.

On the other hand, when the remaining level of the in-vehicle battery 101 is lower than the threshold, the operation limiting unit 303 stops the operation of the wireless communication unit 301 at the number of resets less than X in the wireless communication unit 301, as represented by the dashed line 802 of FIG. 8. With this configuration, the operation limiting unit 303 is able to stop the operation of the wireless communication unit 301 with a further less amount of electric power consumed when the remaining level of the in-vehicle battery 101 is low.

In this way, according to the embodiments of the disclosure, in an in-vehicle system (1) that performs wireless communication with electric power supplied from a battery (101) of a vehicle (10), power consumption from the battery (101) can be limited even in the event of an abnormality that is difficult to recover from with software.

The embodiments of the disclosure are described above; however, the disclosure is not limited to the above-described embodiments. Various modifications or alterations are applicable within the scope of the purport of the disclosure described in the appended claims.

What is claimed is:

1. An in-vehicle system that performs wireless communication with electric power supplied from a battery mounted on a vehicle, the in-vehicle system comprising:
a wireless communication unit configured to perform the wireless communication;
a counting unit configured to count a number of resets that have occurred in the wireless communication unit; and
an operation limiting unit configured to, when a predetermined power supply of the vehicle is off, limit the number of resets that occur in the wireless communication unit,
wherein the operation limiting unit is configured to, when the number of resets, counted by the counting unit, has reached a predetermined number or exceeded the predetermined number while the predetermined power supply is off, stop operation of the wireless communication unit, and
wherein the operation limiting unit is configured to change the predetermined number according to a remaining level of the battery.

2. The in-vehicle system according to claim 1, wherein the predetermined power supply includes an accessory power supply of the vehicle.

3. The in-vehicle system according to claim 1, further comprising a warning unit configured to, when the operation limiting unit is stopping the operation of the wireless communication unit, output a warning indicator or a warning sound indicating that an abnormality is occurring.

4. The in-vehicle system according to claim 1, wherein the counting unit is configured to count the number of resets in a part or a hardware component configured to perform the wireless communication.

5. The in-vehicle system according to claim 1, wherein the operation limiting unit is configured to, when the number of resets, counted by the counting unit, when the predetermined power supply is off has reached the predetermined number or exceeded the predetermined number, stop supplying electric power to a part or a hardware component configured to perform the wireless communication.

6. The in-vehicle system according to claim 1, wherein the operation limiting unit is configured to increase the predetermined number when the remaining level of the battery is greater than a predetermined threshold, and is configured to decrease the predetermined number when the remaining level of the battery is lower than the predetermined threshold.

7. The in-vehicle system according to claim 1, wherein the operation limiting unit is configured to resume operation of the wireless communication unit when the number of resets, counted by the counting unit, has reached the predetermined number or exceeded the predetermined number, and the predetermined power supply of the vehicle is on.

8. The in-vehicle system according to claim 1, wherein the counting unit is configured to stop counting the number of resets that have occurred in the wireless communication unit when the number of resets, counted by the counting unit, is lower than the predetermined number, and the predetermined power supply of the vehicle is on.

9. A wireless communication device that performs wireless communication with electric power supplied from a battery mounted on a vehicle, the wireless communication device comprising:

a wireless communication unit configured to perform the wireless communication;

a counting unit configured to count a number of resets that have occurred in the wireless communication unit; and an operation limiting unit configured to, when a predetermined power supply of the vehicle is off, limit the number of resets that occur in the wireless communication unit, wherein the operation limiting unit is configured to, when the number of resets, counted by the counting unit, has reached a predetermined number or exceeded the predetermined number while the predetermined power supply is off, stop operation of the wireless communication unit, and wherein the operation limiting unit is configured to change the predetermined number according to a remaining level of the battery.

10. A control method for an in-vehicle system that performs wireless communication with electric power supplied from a battery mounted on a vehicle, a computer mounted on the vehicle being configured to execute: a process of counting a number of resets that have occurred in a wireless communication unit configured to perform the wireless communication; a process of, when a predetermined power supply of the vehicle is off, limiting the number of resets that occur in the wireless communication unit; a process of stopping operation of the wireless communication unit when the number of resets, counted by a counting unit, has reached a predetermined number or exceeded the predetermined number while the predetermined power supply is off; and a process of changing the predetermined number according to a remaining level of the battery.

* * * * *